(12) United States Patent
de Zeeuw et al.

(10) Patent No.: US 10,407,589 B2
(45) Date of Patent: Sep. 10, 2019

(54) HYDROPHILIC COATING FOR HEAT EXCHANGERS

(71) Applicant: Henkel AG & Co. KGaA, Duesseldorf (DE)

(72) Inventors: Ard de Zeeuw, Duesseldorf (DE); Thomas Moeller, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/363,044

(22) Filed: Nov. 29, 2016

(65) Prior Publication Data

US 2017/0073539 A1 Mar. 16, 2017

Related U.S. Application Data

(63) Continuation of application No. PCT/EP2015/061775, filed on May 28, 2015.

(30) Foreign Application Priority Data

May 30, 2014 (DE) ..................... 10 2014 210 278.2

(51) Int. Cl.
  *F28F 19/04* (2006.01)
  *C09D 129/04* (2006.01)
  *C09D 7/65* (2018.01)

(52) U.S. Cl.
  CPC .............. *C09D 129/04* (2013.01); *C09D 7/65* (2018.01); *F28F 19/04* (2013.01); *F28F 2245/02* (2013.01)

(58) Field of Classification Search
  CPC ....... C09D 129/04; C09D 7/125; C08L 83/04; F28F 19/04; F28F 2245/02
  USPC ........................................................ 427/384
  See application file for complete search history.

(56) References Cited

U.S. PATENT DOCUMENTS

| | | | |
|---|---|---|---|
| 3,985,584 A | 10/1976 | Chan et al. | |
| 5,350,445 A | 9/1994 | Mikami et al. | |
| 5,813,452 A | 9/1998 | Haruta et al. | |
| 7,503,381 B2 | 3/2009 | Inbe et al. | |
| 2003/0037914 A1* | 2/2003 | Inbe ........................ | C08L 71/02 165/133 |
| 2009/0242177 A1* | 10/2009 | Morioka .................. | C09D 1/00 165/133 |
| 2012/0152754 A1 | 6/2012 | Schlosser et al. | |
| 2016/0032081 A1* | 2/2016 | Ieda ..................... | C09D 129/04 524/83 |

FOREIGN PATENT DOCUMENTS

| | | | |
|---|---|---|---|
| DE | 2640638 A1 | 3/1978 | |
| DE | 69208291 T2 | 8/1996 | |
| DE | 602005001592 T2 | 8/1996 | |
| DE | 19639897 A1 | 4/1998 | |
| EP | 1245654 A1 | 10/2002 | |
| EP | 2380938 A1 | 10/2011 | |
| JP | 2001247822 A | 9/2001 | |
| JP | 2010007013 A | 1/2010 | |
| WO | 2012165494 A1 | 12/2012 | |
| WO | WO-2014178402 A1 * | 11/2014 | ........... C09D 129/04 |

OTHER PUBLICATIONS

International Search Report for PCT/EP2015/061775, dated Aug. 10, 2015. All references cited in the International Search Report are listed herein.

* cited by examiner

*Primary Examiner* — Alexander M Weddle
(74) *Attorney, Agent, or Firm* — Mary K. Cameron

(57) ABSTRACT

The present invention relates to hydrophilic coatings for heat exchangers, and methods and compositions for depositing such coatings comprising applying a composition comprising at least one curable polyvinyl alcohol and at least one wetting agent to a surface of a metal substrate and curing the composition on the surface of the metal substrate.

11 Claims, No Drawings

HYDROPHILIC COATING FOR HEAT EXCHANGERS

The present invention relates to the use of a composition containing at least one curable polyvinyl alcohol and at least one wetting agent for coating a metal substrate, and to a method for coating a substrate of this type in which the composition is used.

Owing to their surface tension, metal substrates have a higher tendency to form droplets of condensed water. Particularly if there is high humidity, more droplets form, and this encourages metal substrates to corrode. In particular, the formation of water droplets on heat exchangers is undesirable since droplet formation prevents closed water films on the surface. Closed water films advantageously have a high rate of evaporation, and heat exchangers are therefore cooled more rapidly and efficiently. In order to protect metal substrates, in particular heat exchangers, from corrosion, they are conventionally coated with epoxy resins, which, however, are not sufficiently hydrophilic to prevent droplets of condensed water from forming.

A problem addressed by the present invention is therefore to provide a coating which has strong adhesion to metal substrates and is hydrophilic, in order to thus prevent water droplets from forming.

Surprisingly, it has been found that a composition comprising at least one curable polyvinyl alcohol and at least one wetting agent makes possible coatings on metal substrates which have strong adhesion to metal substrates and have a high level of hydrophilicity, the coating not being water soluble, however.

The hydrophilic coating adheres very well to metal substrates, and is also capable of stabilizing closed water films without dissolving in water in the process. The water film stabilized by means of the coating ensures high rates of evaporation and thus efficient and rapid cooling of heat exchangers, and this results in improved performance and a longer service life of the heat exchanger. Furthermore, according to the invention, the coating protects the metal substrate from corrosion.

Therefore, in a first aspect, the present invention relates to the use of a composition containing at least one curable polyvinyl alcohol and at least one wetting agent for coating a metal substrate, preferably a heat exchanger, preferably made of strip aluminum, strip steel, or galvanized or alloy-galvanized strip steel in methods of coating metal substrates.

In another aspect, the present invention relates to a method for coating a metal substrate, preferably a heat exchanger, comprising the steps of:
applying a composition as described herein to a surface of the substrate; and
curing the composition by warming/heating to a temperature of from 60 to 230° C.

These and other aspects, features and advantages of the invention will become clear to a person skilled in the art from studying the following detailed description and the claims. Here, any feature from one aspect of the invention can be used in any other aspect of the invention. Furthermore, the examples contained herein are intended to describe and illustrate the invention but do not restrict the invention, and in particular the invention is not restricted to these examples. All the percentages are % by weight, unless otherwise stated. Numerical ranges in the format "of from x to y" include the stated values. If a plurality of preferred numerical ranges are given in this format, it is clear that all the ranges that arise from combining the various limit values are also covered.

"At least one", as used herein, refers to one or more, for example 1, 2, 3, 4, 5, 6, 7, 8, 9 or more. In connection with components of the compositions described herein, this information does not refer to the absolute amount of molecules, but to the type of the component. "At least one curable polyvinyl alcohol" therefore means, for example, one or more curable polyvinyl alcohols, i.e. one or more different types of curable polyvinyl alcohol. Together with quantities, the quantities refer to the total amount of the correspondingly identified type of component, as already defined above.

As already described above, the coating composition contains at least one curable polyvinyl alcohol and at least one wetting agent. Polyvinyl alcohols are well established in the prior art. They are conventionally obtained by the saponification of polyvinyl esters, preferably polyvinyl acetate. According to the invention, any polyvinyl ester and mixtures thereof that are known from the prior art and are suitable for this purpose can be used. Polyvinyl esters can be obtained by means of radical, anionic or cationic polymerization from their monomers. In a preferred embodiment of the present invention, the curable polyvinyl alcohol has a degree of saponification of at least 95%, preferably of at least 96% and preferably of at least 97%. The degree of saponification states how many of the ester groups have been saponified to alcohol groups. Furthermore, the polyvinyl alcohols used may for example contain silicon, amine and thiol groups. Furthermore, the composition may include additional hydrophilic polymers, such as hydroxyl-group-containing acrylic resins, polyacrylic resins, polyvinyl sulfonic acids, polyvinyl imidazole, polyethylene oxide, polyamide and water-soluble nylon, said polymers being contained in total in a lower quantity than the polyvinyl alcohol in the composition. The molecular weight Mw of the polyvinyl alcohols according to the invention is usually in the range of from 10,000 to 120,000 g/mol, particularly preferably in the range of from 20,000 to 60,000 g/mol.

In another preferred embodiment, the polyvinyl alcohol is curable at a temperature of from 60 to 230° C., preferably of from 180 to 210° C. Without being restricted to a particular theory, it is assumed that ether bonds are established at these temperatures together with dehydration, and therefore the coating is cured. Owing to this thermally induced polycondensation, the coating obtained has greater mechanical resistance.

In one embodiment of the present invention, the composition according to the invention may additionally contain curing agents. These may further increase the mechanical resistance of the coating by intensifying the curing of the polyvinyl alcohol. To this end, all conventional curing agents that are suitable for this purpose can be used, for example sulfur-containing or amine-functionalized latent curing agents. Furthermore, modified and unmodified polyamines or polyamides, such as triethylene tetramine, tetraethylene pentamine, diethylene triamine, cyanoguanidine, dicyandiamides and the like, can also be used. Furthermore, curing accelerators, such as modified or unmodified urea, for example diphenylmethane-bis-urea, an imidazole or mixtures thereof, can be added. In a preferred embodiment, however, organic polymers and/or copolymers having free and/or esterified carboxylate groups that do not represent curable polyvinyl alcohols are used as curing agents, which may be contained in the composition in quantities of preferably less than 3% by weight, particularly preferably less than 1% by weight. A representative of this type of curing agent is for example polyacrylic acid, which likewise can react with the polyvinyl alcohol, additionally cure the coating and also promote the adhesion between the coating and the metal substrate. In a preferred embodiment of the present invention, however, only the self-cross-linking properties of the curable polyvinyl alcohol are used, and therefore the composition contains, in total, less than 1% by weight, particularly preferably less than 0.1% by weight, of organic polymers and/or copolymers of this type which represent neither curable polyvinyl alcohols nor polymers and/or copolymers having free and/or esterified carboxylate groups. In this context, the presence of inorganic curing agents is also omitted, and therefore the composition preferably contains less than 0.01% by weight, preferably less than 0.001% by weight, of water-soluble inorganic compounds of the elements Zr and/or Ti.

In addition, the composition according to the invention contains at least one wetting agent. Any wetting agent that is well established in the prior art and is expedient can be used. Therefore, the wetting agent may be a non-ionic, surface-active substance and may substantially be based on ethoxylation products, for example ethoxylated acetylene diols or acetylene diol/EO-acetylene diol mixtures. In a preferred embodiment, the wetting agent is a polyether siloxane. In general, polyether siloxanes have the formula $X-SiR^1R^2-O-(SiR^1R^2)_n-SiR^1R^2-X$, in which each X independently is $-OH$, $-CH=CH_2$ or phenyl, each $R^1$ and $R^2$ independently is an alkyl having 1 to 10 C atoms, preferably methyl, ethyl or propyl, $-CH=CH_2$ or phenyl, where n is 10 to 10,000. The polyether siloxanes may be both linear and branched. In turn, it is preferable for providing a hydrophilic surface if the composition contains the polyether siloxane in a quantity of from 0.1 to 5% by weight, particularly preferably 0.2 to 2% by weight, based on the total composition, the quantity ratio of curable polyvinyl alcohol to polyether siloxane in the composition preferably being in the range of from 20:1 to 80:1.

The metal substrate to which the coating according to the invention is applied may be any metal substrate known from the prior art. The substrate contains at least one metal, for example iron, zinc, aluminum and/or alloys of these metals, and galvanized or alloy-galvanized steel. Optionally, the metal substrate may be pretreated with a varnish. It should be noted at this point that, according to the invention, the coating either can be applied directly to the metal substrate or, if the metal substrate is varnished, can be applied to the varnish layer. The coating according to the invention gives the metal substrate good corrosion protection, inter alia. In a preferred embodiment, the metal substrate is a heat exchanger. Heat exchangers are devices which transfer heat energy from one substance flow to another. In heat exchangers, the substance flows are spatially separated by a heat-permeable wall. When applied to metal substrates, in particular to heat exchangers, the coating according to the invention prevents the formation of water droplets on the surface, and therefore a continuous water film forms on the surface. The surface-to-volume ratio is advantageous in water films. Water films have a large surface area and a small volume. Therefore, water films on the surface of heat exchangers are advantageous since the water rapidly evaporates, the heat exchanger efficiently cools and thus a rapid and efficient exchange of heat energy is made possible. In a preferred embodiment, the coating has a layer thickness of from 0.1 to 10 μm, preferably of from 1 to 4 μm.

Before the coating is applied to the metal substrate, said substrate can be chemically and/or physically pretreated. The substrate may for example be cleaned using a cleaning solution. For this purpose, it may be sprayed with an appropriate agent or immersed in a bath containing the cleaning agent. Optionally, the metal substrate may be etched. These pretreatments may take place at room temperature or at a higher temperature. Optionally, an undercoat made of resin or polyurethane may be applied before the coating according to the invention in order to increase the corrosion resistance.

In a preferred embodiment, the composition is an aqueous solution or a dispersion. According to the invention, these are understood to be dispersions, emulsions and solutions having water as the main solvent. However, other solvents may also be added, such as organic solvents, for example acetone, tert-butyl methyl ether, cyclohexane, alcohols, such as ethanol and n-propanol, triethylamine and toluene. In general, any solvent that is suitable for this purpose can be used. The aqueous dispersions may contain organic solvents, but are preferably substantially free of organic solvents of this type. The concentration of the at least one polyvinyl alcohol may be selected to be variable, and is preferably between 5 and 95% by weight, more preferably between 10 and 60% by weight, particularly preferably between 20 and 40% by weight, based on the total composition. Furthermore, the composition may contain inorganic fillers, emulsifiers, surfactants, pigments and/or dyes, and optionally other additives. Other additives may for example be antimicrobial active ingredients and aromatic substances. Zinc pyrithione, 2-(4-thiazolyl)benzimidazole, 1,2-benzisothiazoline, 2-n-octyl-4-isothiazolin-3-one, N-(fluorodichloromethyl-thio)phthalimide, N,N-dimethyl-N'-phenol-N'-fluorodichloromethyl-thio)sulfamide, methyl-2-benzimidazole carbamate, bis(dimethylthiocarbamoyl) disulfide, N-(trichloromethyl-thio)-4-cyclohexane-1,2-dicarboximide and barium metaborate can be used as antimicrobial active ingredients, for example. Water-soluble polyamides, flavonoids, aqueous phenols, hydrazine derivatives, such as carbodihydrazides, hydrazinadipate, hydrazinsebatate, hydrazindidodecate, hydrazinisophthalate, 1,6-hexamethylene-bis(N,N'-dimethyl semicarbazide) or 1,1,1',1'-tetramethyl-4,4'-(methylene-di-p-phenylene)di-semicarbazide can be used as aromatic substances, for example. These additives are intended to prevent infestations by fungi and bacteria and the associated development of bad odors.

In another aspect, the present invention relates to a method for coating a metal substrate, preferably a heat exchanger, comprising the steps of:
applying a composition as described herein to a surface of the substrate; and
curing the composition by warming/heating to a temperature of from 60 to 230° C.

The composition according to step (i) of the method according to the invention can be applied using any conventional techniques and methods that are suitable for this purpose. In a preferred embodiment of the present invention, the composition is applied to the metal substrate, in particular to the heat exchanger, to an appropriate wet film thickness by means of spraying, dipping, rotation-coating, roller application, doctoring and/or printing. It may be applied at room temperature or at a temperature of from 25 to 70° C. Furthermore, it can be applied at a higher temperature. In step (i) of the method according to the invention, the composition is applied to such a wet film thickness that, after the warming/heating in step (ii), i.e. the curing, the composition has a dry film thickness of from 0.1 to 10 μm, preferably of from 1 to 4 μm. In the following step (ii) of the method, the composition is cured by warming/heating at a temperature of from 60 to 230° C. Preferably, the composition is cured at a temperature of from 180 to 210° C. The warming/heating can be carried out using any methods or techniques and apparatuses that are well established in the prior art, such as using a furnace or a hot air blower. According to requirements, step (ii) can be carried out for a few minutes up to several hours, for examples from 0.1 to 72 hours, preferably from 1 to 48 hours.

What is claimed is:

1. A method of coating a metal substrate comprising:
   applying a composition comprising at least one curable polyvinyl alcohol present in an amount between 5 and 95% by weight and at least one wetting agent present in a quantity of from 0.1 to 5% by weight to a surface of a metal substrate, both quantities based on total composition;
   (ii) curing the composition on the surface of the metal substrate by heating to a temperature of from 180° C. to 210° C. thereby forming a cured coating, the cured coating being hydrophilic and not water soluble; and optionally pretreating the metal substrate with a varnish or an undercoat before step (i).

2. The method according to claim 1, wherein the at least one wetting agent comprises a polyether siloxane present in a quantity of from about 0.2 to about 2% by weight, based on total composition.

3. The method according to claim 1, further comprising cleaning and etching the metal substrate prior to step (i) and wherein the metal substrate is a heat exchanger and the composition is applied in step (i) by spraying, dip-coating, rotation-coating and/or printing.

4. The method according to claim 1, wherein the composition is applied in a wet film thickness such that, the heating in step (ii) produces a dry film thickness of from 0.1 to 10 µm.

5. The method according to claim 1, wherein the at least one curable polyvinyl alcohol has a degree of saponification of at least 95%.

6. The method according to claim 1, wherein the at least one curable polyvinyl alcohol is present in the composition in a quantity of between about 20% by weight and about 60% by weight, based upon total composition.

7. The method according to claim 1, wherein the composition contains curing agents selected from organic polymers and/or copolymers having free and/or esterified carboxylate groups, different from the curable polyvinyl alcohols, said curing agents being present in an amount of less than 3% by weight.

8. The method according to claim 1, wherein self-crosslinking properties of the at least one curable polyvinyl alcohol thereby form a cross-linked cured coating in step (ii) such that the composition contains, in total, 0 to less than 1% by weight of organic polymers and/or copolymers which are neither curable polyvinyl alcohols, nor polymers and/or copolymers having free and/or esterified carboxylate groups.

9. The method according to claim 1, wherein the composition contains no water-soluble inorganic compounds of elements Zr and/or Ti.

10. The method according to claim 1, wherein the at least one wetting agent is a polyether siloxane, and a quantity ratio of the at least one curable polyvinyl alcohol to the polyether siloxane in the composition is in a range of from 20:1 to 80:1.

11. The method according to claim 1, wherein the composition is an aqueous solution or dispersion.

* * * * *